N. A. MENAAR.

TEA-KETTLE.

No. 7,428. Reissued Dec. 12, 1876.

Witnesses,
Amos W. Sangster.
J. R. Little

Inventor,
Nicholas A. Menaar
By James Sangster
Atty.

THE GRAPHIC CO. N.Y.

UNITED STATES PATENT OFFICE.

NICHOLAS A. MENAAR, OF BUFFALO, NEW YORK.

IMPROVEMENT IN TEA-KETTLES.

Specification forming part of Letters Patent No. 164,385, dated June 15, 1875; reissue No. 7,428, dated December 12, 1876; application filed May 6, 1876.

*To all whom it may concern:*

Be it known that I, NICHOLAS A. MENAAR, of the city of Buffalo, in the county of Erie and State of New York, have invented certain new and useful Improvements in Tea-Kettles, of which the following is a specification:

My invention relates to certain improvements in sheet-metal tea-kettles; and it consists, first, in the combination of the cover and a slightly elliptical rim, having the middle portion of smaller diameter than the lower part or edge, for purposes which will be more clearly hereinafter shown; second, a tea-kettle having the body composed of two parts, and seamed together at or near the center, but on a line not intersecting the junction of the spout, the lower portion of which is provided with a pit of smaller diameter and formed in one piece with it, and the breast of which constitutes an integral part of the upper portion of such body. In this construction there is, therefore, only a single seam in the entire body of the kettle besides the seam by which the spout is united thereto, and both these seams can be soldered upon the inside, so that the exterior of the kettle will present a perfect unmarred finish.

Figure 1:
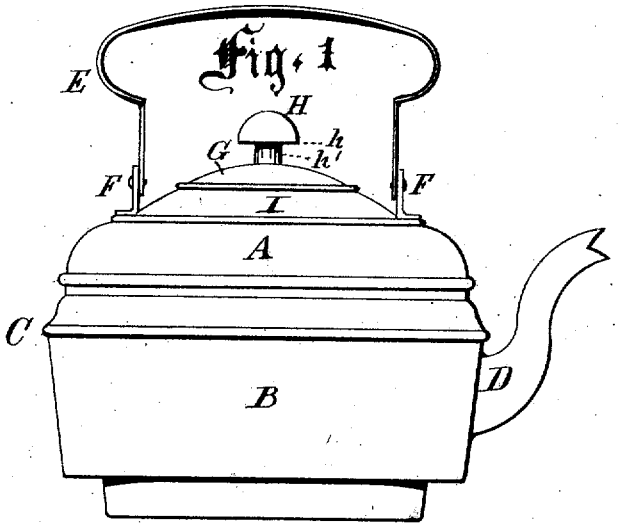
Figure 2:
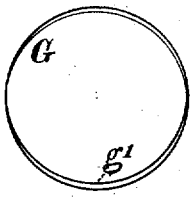
Figure 3:
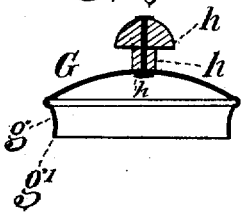
Figure 4:
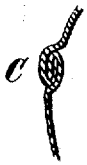

In the accompanying drawings, in which corresponding parts in the several figures are represented by like letters, Figure 1 is a side elevation of the tea-kettle complete; Fig. 2, a view of the lower edge of the rim of the cover; Fig. 3, a vertical section through the center of the cover; Fig. 4, a section through a fragment of the body of the tea-kettle.

In said drawings, A represents the upper part of the body; B, the lower part. It is joined or seamed together at C, substantially as shown. D is the spout, which is also seamed, or otherwise fastened to the kettle, on one side of the seam C. This construction enables me to solder the seam C on the inside of the kettle, which is of especial importance in fine brass or copper kettles, because soldering the seam on the outside would prevent a fine finish, and would destroy the fine appearance of the kettle. The section [illegible] which crowns over the upper portion of the body, and is called the breast, forms an integral part of such upper portion. E represents the handle, jointed to the ears F in the ordinary way. G is the cover. The lower edge of the rim is bent or made slightly oval, as shown in Fig. 2, so that when forced down in place in the circular opening at the top of the kettle it will act as a spring, so as to hold and prevent it from falling out, the lower edge of the rim being made a little larger than the middle, as shown at $g\ g'$, Fig. 3. H represents the knob, which is composed of the parts $h\ h^1$ and the rivet $h^2$. The part $h$ is made of porcelain, and $h^1$ of wood, or other non-conducting material, the object being to prevent the burning of the fingers while handling it.

I claim—

1. A tea-kettle, the body of which is composed of two nearly equal parts, the junction of which does not intersect the opening for the spout, and is sufficiently below the breast to permit of convenient inside soldering through the throat of the upper part, substantially as specified.

2. The combination of the cover G with the rim, formed slightly elliptical, and having its diameter smaller at $g$ than at $g'$, substantially as and for the purposes described.

NICHOLAS A. MENAAR.

Witnesses:

JAMES SANGSTER,

F. P. STIKER.